3,555,059
PROCESS FOR THE PRODUCTION OF
ω-AMINOALKANE NITRILES
Hans-Helmut Schwarz, Krefeld-Bockum, and Otto Immel, Krefeld-Urdingen, Germany, assignors to Farbenfabriken Bayer Aktiengesellschaft, Leverkusen, Germany, a corporation of Germany
No Drawing. Filed June 10, 1968, Ser. No. 735,556
Claims priority, application Germany, July 7, 1967, F 52,884
Int. Cl. C07c 121/12
U.S. Cl. 260—465.2   6 Claims

ABSTRACT OF THE DISCLOSURE

In the process for producing ω-aminoalkane nitriles by reacting the corresponding lactam with excess of ammonia in the gaseous phase in the presence of a dehydration catalyst the improvement comprising using titanium dioxide as dehydration catalyst.

---

The invention relates to an improved process for the production of ω-aminoalkane nitriles by the reaction of appropriate lactams with excess ammonia at an elevated temperature in the gaseous phase over solid catalysts. Whereas hitherto, for example, copper on silicagel, kaolin, aluminium oxide or aluminium phosphate or phosphoric acid on a carrier have been used as catalyst for this reaction, the process of the invention is characterised by the use of titanium dioxide as catalyst.

Whereas the catalysts hitherto used give only poor yields or have only a low activity or are very sensitive to oxygen, the catalyst to be used according to the invention do not have these disadvantages.

Suitable for the process are naturally occurring as well as industrially produced titanium dioxides, and rutiles as well as anatases. Preference is given to the use of titanium dioxides which are industrially produced as white pigments and may contain small amounts of silicon dioxide, phosphoric acid, aluminium oxide, zinc oxide, alkali metals or alkaline earth metals.

The said catalyst can be used with or without a carrier.

The reaction of the lactams with ammonia is expediently carried out under normal pressure and in the temperature range from about 280 to about 400° C., preferably between about 300 and about 360° C.

The contact time of the gaseous mixture with the catalysts should lie between about 0.1 and about 10 seconds.

The expedient amount of ammonia is more than 5 moles, preferably about 10 to about 20 moles per mole lactam.

The catalyst can be used as solid bed catalyst or as fluid bed catalyst.

When the activity of the catalyst has diminished, it can be restored by heating the catalyst with oxygen or air.

Lactams suitable for the process are, for example, butyrolactam, valerolactam, oenanthlactam and laurinlactam, but in industry the conversion of ε-caprolactam into ε-amino-capronitrile is of predominant importance. It is also possible to use the so-called cleavage lactam obtained by depolymerisation of polycaprolactam.

The ω-aminoalkane nitriles are important as intermediates for the production, for example, of the corresponding diamines by hydrogenation or for the production of pest control agents.

EXAMPLE 1

720 g. caprolactam are passed in the course of 16 hours at 330° C. together with 80 Nl. ammonia per hour over 90 ml. titanium dioxide pigment in the rutile modification with a particle size of 0.5 to 1 mm. The reaction product is distilled under reduced pressure and yields 715 g. of a distillation product consisting of 71 percent by weight of unreacted caprolactam and 29 percent by weight of aminocaproic acid nitrile. The conversion of caprolactam amounts to 29.6%, the yield of aminocaproic acid nitrile is 97.3% of theory, referred to the reacted caprolactam.

EXAMPLE 2

800 g. caprolactam and 143 Nl., per hour, of ammonia are passed at 370° C. in the course of 20 hours over 90 ml. titanium dioxide pigment of anatase structure, which has been pressed into pills of 3 mm. The crude product is distilled under reduced pressure. It yields 782.5 g. of distillation product which consists of 46 percent by weight of unreacted lactam and 54 percent by weight of aminocaproic acid nitrile. This corresponds to a conversion of 55% and a yield of 97% of theory, referred to the reacted caprolactam.

EXAMPLE 3

Titanium dioxide (rutile) is pressed with the use of 2% aluminium stearate to form pills of 2 mm. and is calcinated at 400° C. for 3 hours with the access of air. 45 g. caprolactam and 80 Nl., ammonia per hour, are passed over 90 ml. of this catalyst at 330° C. The following conversion values are found in the daily analysis of the reaction products.

| Operating time, hours: After— | Conversion of caprolactam, percent |
|---|---|
| 21 | 29 |
| 43 | 28 |
| 65 | 29 |
| 87 | 29 |
| 100 | 32 |
| 167 | 28 |

In order to test the sensitivity of the catalyst to oxygen, the experiment is repeated, and 40 g. caprolactam, 72 Nl. ammonia and 150 ml. air are passed every hour over 80 ml. of the catalyst at 330° C. After 22 hours' operating time, the conversion amounts to 27%. It has not decreased after a further 2 days.

EXAMPLE 4

397.4 g. laurinlactam and 40 Nl., per hour, of ammonia are passed at 350° C. in the course of 27.3 hours over 80 g. titanium dioxide pigment with rutile structure, which has been pressed with 3 percent by weight graphite to form pills of 6·2·4 mm. The reaction product (400.9 g.) is condensed. The organic component thereof contains 89 percent by weight ω-aminododecanic acid nitrile and 10 percent by weight laurinlactam. The ω-aminododecanic acid nitrile (B.P. 132° C./0.7 mm. Hg; $n_D^{25}=1.4552$) is identified by IR, NMR and elementary analysis.

The elementary analysis yields $C_{12}H_{24}N_2$.—Calculated (percent): C, 73.3; H, 12.3; N, 14.3. Found (percent): C, 73.1; H, 12.4; N, 14.6.

What is claimed is:

1. A process for producing ω-aminoalkane nitriles wherein the alkane moiety contains from 3 to 11 carbon atoms which comprises heating the corresponding lactam with about 5 to about 20 mols of ammonia per mol of lactam in the gaseous phase in the presence of titanium dioxide as dehydration catalyst for from about 0.1 to about 10 seconds at a temperature from about 280 to about 400° C.

2. The process of claim 1 wherein said heating is at a temperature from about 300 to about 360° C.

3. The process of claim 1 wherein the titanium dioxide dehydration catalyst is in the form of a solid bed.

4. The process of claim 1 wherein said titanium dioxide dehydration catalyst is in the form of a fluidized bed.

5. The process of claim 1 wherein said lactam is selected from the group consisting of butyrolactam, valerolactam, caprolactam, oenanthlactam and laurinlactam.

6. The process of claim 1 wherein said lactam is ε-caprolactam.

References Cited

UNITED STATES PATENTS

| 2,375,005 | 5/1945 | Kung | 260—465.2 |
| 2,830,072 | 4/1958 | Garritsen et al. | 260—465.5 |
| 3,036,113 | 5/1962 | Ottenheym | 260—465.2 |

OTHER REFERENCES

Goldberg, et al.: C.A., vol. 42 (1948), p. 1187.

JOSEPH P. BRUST, Primary Examiner

U.S. Cl. X.R.

260—465.5